(12) United States Patent
Yoshida

(10) Patent No.: US 8,307,993 B2
(45) Date of Patent: Nov. 13, 2012

(54) FILTER APPARATUS

(76) Inventor: Takerou Yoshida, Kurashiki (JP)

( * ) Notice: Subject to any disclaimer, the term of this patent is extended or adjusted under 35 U.S.C. 154(b) by 248 days.

(21) Appl. No.: 12/531,987

(22) PCT Filed: Jan. 15, 2008

(86) PCT No.: PCT/JP2008/050316
§ 371 (c)(1),
(2), (4) Date: Sep. 18, 2009

(87) PCT Pub. No.: WO2008/114518
PCT Pub. Date: Sep. 25, 2008

(65) Prior Publication Data
US 2010/0096310 A1    Apr. 22, 2010

(30) Foreign Application Priority Data
Mar. 22, 2007    (JP) .................... 2007-075026

(51) Int. Cl.
*B01D 29/92*    (2006.01)
*B01D 29/11*    (2006.01)

(52) U.S. Cl. .................. 210/497.3; 210/498; 210/512.1; 210/337; 210/243; 210/151; 210/437; 210/497.01

(58) Field of Classification Search .................. 210/600, 210/151, 437, 787, 304, 312.1, 497.01, 456, 210/450, 243, 337, 497.3, 498, 512.1; 68/12.14
See application file for complete search history.

(56) References Cited

U.S. PATENT DOCUMENTS
6,723,240 B1    4/2004 Minemura

FOREIGN PATENT DOCUMENTS
| EP | 0 380 266 A1 | 8/1990 |
|----|----|----|
| GB | 2 290 086 | 12/1995 |
| GB | 2 337 948 | 12/1999 |
| JP | 51-17269 U | 2/1976 |

(Continued)

OTHER PUBLICATIONS

European Search Report dated Apr. 28, 2011, corresponding to related European Application No. 08703180.3.

(Continued)

*Primary Examiner* — Joseph Drodge
*Assistant Examiner* — Cameron J Allen
(74) *Attorney, Agent, or Firm* — Knobbe Martens Olson & Bear LLP

(57) ABSTRACT

A filter apparatus that while maintaining a high revolution speed, realizes reduction of filter element vibration. The filter apparatus is one comprising cylindrical main-body vessel (1); tubular filter element (7) having a multiplicity of filter pores (7a) for removal of foreign matter contained in liquid, disposed in the main-body vessel (1) coaxially with the main-body vessel (1); inflow pipe (5) for introduction of a liquid containing separation objects, disposed in a direction tangential to a circumferential wall surface of the main-body vessel (1); outflow pipe (8) for outflow of the filtrate having passed through the filter element (7); and foreign matter discharge pipe (12) for discharging of the separation objects together with the liquid, disposed in a direction tangential to the circumferential wall surface of the main-body vessel (1), wherein the filter pores (7a) partially or wholly are formed into a taper such that the pore size on a fluid inflow side is different from that on a fluid outflow side.

9 Claims, 8 Drawing Sheets

FOREIGN PATENT DOCUMENTS

| | | | |
|---|---|---|---|
| JP | 59-15413 U | | 1/1984 |
| JP | 59-58006 U | | 4/1984 |
| JP | 61-118611 U | | 7/1986 |
| JP | 2-245209 A | | 10/1990 |
| JP | 7-308519 A | | 11/1995 |
| JP | 10314509 A | * | 12/1998 |
| JP | 2000-29114 A | | 10/2000 |
| JP | 2000-291124 A | | 10/2000 |
| JP | 2001-137628 A | | 5/2001 |
| JP | 2003-190713 A | | 7/2003 |
| JP | 2006-326413 A | | 12/2006 |
| RO | 115418 B | * | 2/2000 |
| WO | WO 94/23848 | | 10/1994 |

OTHER PUBLICATIONS

Chinese Office Action dated Sep. 22, 2011 in corresponding Application No. 200880008795.3.

* cited by examiner

FILTER APPARATUS

This application is the U.S. National Phase under 35. U.S.C. §371 of International Application PCT/JP2008/050316, filed Jan. 15, 2008, which claims priority to Japanese Patent Application No. 2007-075026, filed Mar. 22, 2007. The International Application was published under PCT Article 21(2) in a language other than English.

TECHNICAL FIELD

The present invention relates to a filter apparatus causing a liquid containing a foreign material to flow into and causing a liquid in a state in which the foreign material is removed by a filter element to flow out.

BACKGROUND ART

The filter apparatus mentioned above is utilized in various industry fields. For example, it is utilized in cooling water in a thermal power station and a nuclear power station, water used for hydraulic power generation, water and sewerage corresponding to daily life water, agricultural water, cooling installation such as a heating furnace, a rolling machine, a compressor, a chemical reactor, a distilling apparatus and the like in iron manufacturing, ceramic industry and chemical industry, a producing apparatus for producing fresh water from sea water, sprinkler water spraying equipment and the like. In other words, it is necessary to carry out a water treatment of water, river water, lake water, the sea water and the like, and it is necessary to remove the foreign material by the filter apparatus for the purpose of protecting a water treating machine or the like, in an initial stage of the water treatment. As a target foreign material, there are various materials such as earth and sand, sludge, a wood piece, a metal piece, a plastic piece, a fish, a shell fish, an algae and the like.

A basic structure of the filter apparatus is provided with a cylindrical main body container, and a filter element (a filter) set in an inner portion thereof, introduces a liquid to be filtered such as the water, the sea water or the like into the main body container, and removes the foreign material contained in the liquid by the filter element.

The liquid from which the foreign material is removed is discharged from an outflow pipe, and is utilized as cooling water, recirculated water or the like for the various purposes as mentioned above. The removed foreign material is discharged from a drain pipe at an appropriate timing together with the inflow liquid, and is thereafter disposed. One of the filter apparatus having the purpose mentioned above includes a swirling vortex filter apparatus (a vortex strainer). As the filter apparatus, there have been known structures disclosed in the following Patent Documents 1 and 2. Each of the filter apparatuses has an inflow pipe, an outflow pipe, and a filter tank (a main body container) having a discharge pipe discharging a foreign material, and is provided with a cylindrical or an inverted circular truncated cone shaped filter element fixed within the filter tank. The liquid inflowing from the inflow pipe constructs a swirling flow within the filter tank. It is possible to separate and concentrate the foreign material contained in the liquid by a centrifugal force, by generating the swirling flow, and to discharge it together with the liquid via a drain pipe. Further, Each of the filter apparatuses has a function of self cleaning the foreign material attached to a front face of the filter element by a peeling effect, by generating the swirling flow.

Patent Document 1: Japanese Unexamined Patent Publication No. 2000-291124

Patent Document 2: Japanese Unexamined Patent Publication No. 2003-190713

DISCLOSURE OF THE INVENTION

Problems to be Solved by the Invention

It is preferable that a swirling speed of the swirling flow is higher, for a separating and concentrating power of the foreign material by the centrifugal force mentioned above, and a self cleaning power by the foreign material peeling effect of the filter element front face. However, if the swirling speed is high, the filter element oscillates, and there is generated a problem that a service life of the filter element becomes shorter due to a metal fatigue. As a first cause of the oscillation, there can be listed up an oscillation caused by a Karman's vortex generated in a rear side of a filter hole at a time when the liquid passes through the filter hole of the filter element. As a second cause, there can be listed up an oscillation caused by a fluid boundary layer peeling generated at a time when the swirling flow passes through a front layer of the filter element. As a third cause, there can be listed up an oscillation caused by a collision of the foreign material against the filter element.

In order to reduce the oscillation of the filter element, it is necessary to slow down the passing speed of the filter hole and the swirling speed, and to keep down the collision of the foreign material against the filter element. Accordingly, the swirling speed of the swirling flow has been hard to be made high. Since a reduction of the swirling speed leads to a reduction of a filtering amount, it is necessary to handle by enlarging a size of the filter apparatus main body for increasing the filtering amount in the filter apparatuses disclosed in Patent Documents 1 and 2.

The present invention has been made by taking the actual condition mentioned above into consideration, and an object of the present invention is to provide a filter apparatus which can reduce an oscillation of a filter element while keeping a swirling speed high. In other words, the object is to achieve both of a high performance and a downsizing of a swirling type filter apparatus.

Means for Solving the Problems

In order to solve the above problems, a filter apparatus according to the present invention includes:

a cylindrical main body container;

a tubular filter element which is provided coaxially with the main body container within the main body container, and in which a number of filter holes for removing a foreign material contained in a liquid are formed;

an inflow pipe provided in a tangential direction with respect to a circumferential wall surface of the main body container, and introducing the liquid containing a subject to be separated;

an outflow pipe causing the liquid filtered by the filter element to flow out; and a foreign material discharge pipe provided in the tangential direction with respect to the circumferential wall surface of the main body container, and discharging the subject to be separated together with the liquid, wherein a whole or a part of the filter hole is formed into a taper shape in which a hole size in an inflow side of a fluid is different from a hole size in an outflow side.

A description will be given of an operation and an effect of the filter apparatus in accordance with the structure mentioned above. The cylindrical main body container is provided, and the filter element filtering the liquid containing the foreign material is provided at the inner portion of the main body container. The filter element is formed into the tubular shape and is provided in such a manner as to be coaxial with the main body container. The inflow pipe is provided in the tangential direction with respect to the circumferential wall surface of the main body container. Since it is provided in the tangential direction, the swirling flow is generated by kinetic momentum of the liquid inflowing from the inflow pipe. The foreign material contained in the liquid is collected to the inner wall surface side of the main body container so as to be concentrated, by the centrifugal force of the swirling. The main body container is provided with the foreign material discharge pipe in the tangential direction with respect to the circumferential wall surface, and the foreign material swirled by the swirling flow can be discharged from the foreign material discharge pipe together with the liquid. The liquid passing through the filter element is filtered and is caused to flow out of the outflow pipe. A number of filter holes are formed in the filter element, and the liquid filtered by passing through the filter holes can be caused to flow out of the outflow pipe.

In the case of the filter apparatus based on the swirling flow as mentioned above, since the swirling speed of the swirling flow is applied at a time when the liquid passes through the filter holes, the speed passing through the filter holes tends to be high. Further, the Karman's vortex is generated in the rear side of the filter holes, at a time of passing through the filter holes. Generally, a correlation exists between a kinetic energy loss at a time when the liquid passes through the filter holes of the filter element, and a generation of the Karman's vortex in the rear side of the filter holes or an oscillation caused by the generation of the Karman's vortex. In other words, a part of the loss of the kinetic energy contained in the liquid at a time of passing through the filter holes is converted into an oscillating energy of the filter element. Accordingly, all or a part of the filter holes is formed into a taper shape in which a hole size in the inflow side of the fluid is different from a hole size in an outflow side. Therefore, it is possible to reduce the loss of the kinetic energy at a time of passing through the filter holes, in the case that the liquid passes through the filter holes. Accordingly, it is possible to reduce the generation of the Karman's vortex and the oscillating energy caused thereby, involving the kinetic energy loss. Therefore, even in the case that the swirling speed of the swirling flow is high, and the speed at which the liquid passes through the filter holes is high, it is possible to reduce the oscillation of the filter element caused by the Karman's vortex generated in the rear side of the filter holes. As a result, it is possible to provide the filter apparatus which can reduce the oscillation of the filter element while keeping the swirling speed high.

In the present invention, it is preferable that a concavo-convex portion is provided around the filter hole in an outer peripheral surface of the filter element The high-speed swirling flow is generated on the outer peripheral surface of the filter element, and the peeling of the fluid boundary layer is generated in the front layer of the filter element, and causes the oscillation of the filter element. The front layer of the filter element has the turbulent flow layer by providing the concavo-convex portion around the filter holes on the outer peripheral surface of the filter element, and the peeling of the fluid boundary layer is kept down, so that the oscillation of the filter element can be reduced.

The filter hole according to the present invention is preferably formed by inserting and attaching a bush which is made of a different material from the filter element and in which a taper hole is formed, to each of a number of holes formed in the filter elements.

With the bush mentioned above, it is possible to form the filter hole having the taper, the freedom of the shape of the filter hole is increased, and it is possible to form the filter hole which is suitable for the filter apparatus. Further, the concavo-convex portion can be formed around the filter hole by the bush itself, at a time of attaching the bush to the filter element. Further, it is possible to effectively achieve the oscillation reduction based on the vibration control effect generated by the compounding with the raw material having the different elastic modulus.

In the present invention, it is preferable that a net-like body is provided in an inner peripheral surface side and/or an outer peripheral surface side of the filter element.

With the provision of the mesh-like body, it is possible to confuse the flow of the front face of the filter element, and it is possible to suppress the excitation of the filter element caused by the peeling of the fluid, in accordance with the method of forming the turbulent boundary layer which is harder to be peeled off than the laminar boundary layer. Accordingly, it is possible to reduce the oscillation of the filter element.

In the present invention, it is preferable that a surface having no filter hole is provided in the filter element at a position at which the foreign material discharge pipes face to each other.

At the position at which the foreign material discharge pipes face to each other, a frequency at which the foreign material comes into collision with the filter element is high, and the oscillation of the filter element is caused. Accordingly, it is possible to reduce the oscillation of the filter element due to the collision of the foreign material, by setting the surface having no filter holes, which is hard to oscillate the filter element portion at the position facing to the foreign material discharge pipe.

In the present invention, it is preferable that a sheet layer having an elasticity is provided in the surface having no filter hole.

The filter element is generally made of a metal, and is different in a specific frequency from a material and resin having an elastic property such as a rubber. Accordingly, if the sheet layer having the elastic property is formed in the front face of the filter element, a friction is generated in the junction boundary between the metal and the elastic material and it is possible to attenuate the oscillation. A rubber, an elastomer resin or the like is preferable as the elastic material.

The filter hole according to the present invention is preferably attached to the main body container in a state where a vibration control member is interposed therebetween.

The rubber and the elastomer resin can be used as the vibration control member, whereby it is possible to suppress the oscillation of the filter element and the generation of the noise involving the oscillation.

Preferably, the filter apparatus according to the present invention further includes a first electrode portion attached to the inflow pipe in an insulated state, and a second electrode portion attached to the filter element, wherein an air bubble is capable of being generated in the vicinity of the filter hole of the filter element by exciting between the electrode portions.

A micro electrolyte generated gas bubble (an air bubble) is generated on the front face of the filter element, based on a principle of an electrolytic process, by constructing the first electrode portion and the second electrode portion as mentioned above, and turning on electricity by applying a direct current, an alternating current, a pulse voltage or the like. Accordingly, it is possible to reduce the generation of the Karman's vortex generated in the rear side of the filter holes of the filter element, and it is possible to reduce the oscillation of the filter element caused by the Karman's vortex. Further, based on the generation of the air bubble, it is possible to achieve subordinate operation and effect such as a suppression of a clogging of the filter hole by striking up the foreign material attached to the front face of the filter element.

The filter element according to the present invention is preferably formed into a conical shape having a larger diameter in the inflow pipe side than in the outflow pipe side.

It is possible to disperse the oscillation resonance band by forming the filter element into the conical shape, thereby suppressing the resonance and the oscillation fatigue.

DESCRIPTION OF REFERENCE SYMBOLS

Figure 1:
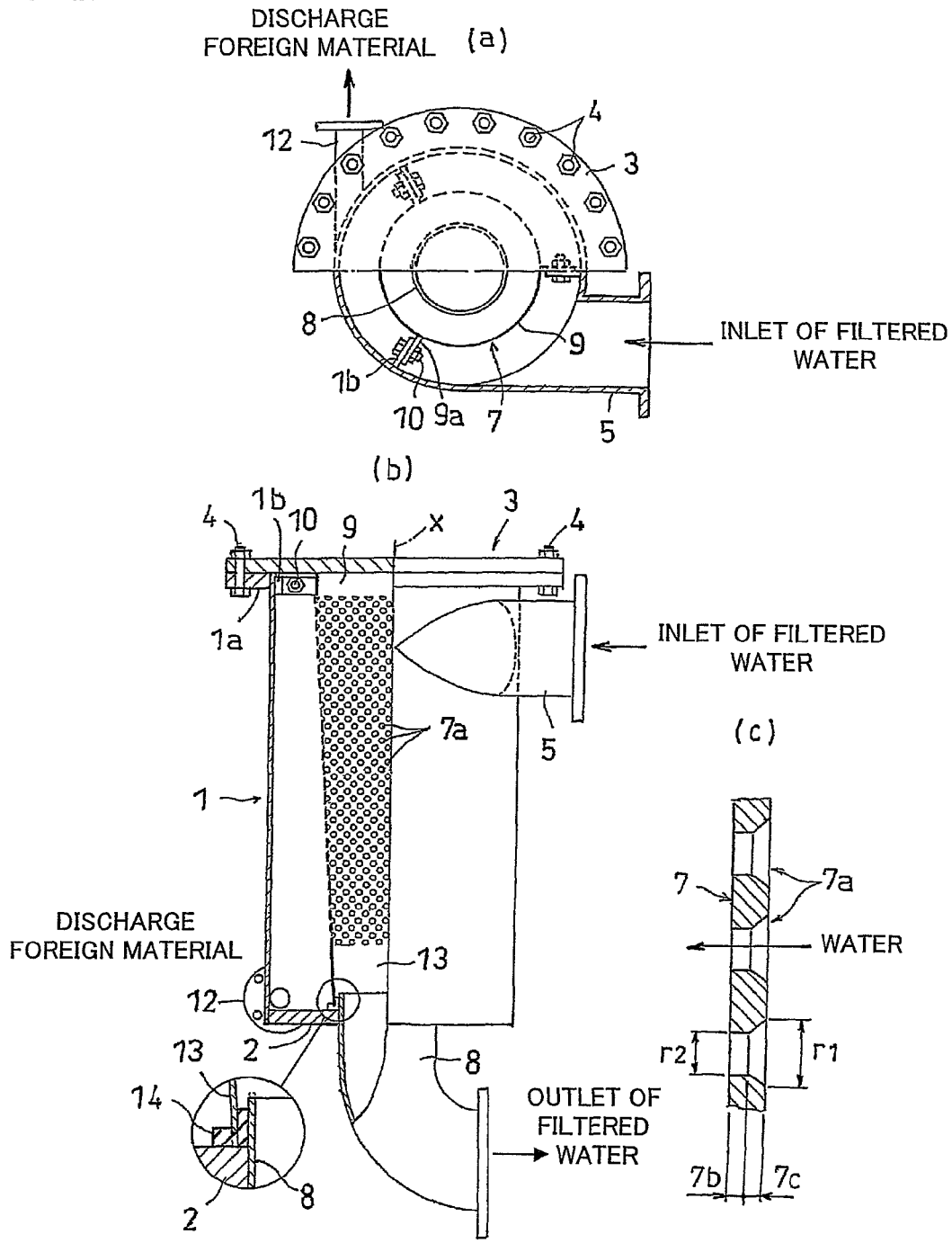
FIG. 1 is a view showing a structure of a filter apparatus in accordance with a first embodiment.

1 Main body container
1a Flange
2 Bottom lid
3 Upper lid
3a Taper surface
5 Inflow pipe
6 Dam
7 Filter element
7a Filter hole
7b Cylinder portion
7c Taper portion
7d Flange
7X Small diameter portion
7Y Large diameter portion
8 Outflow pipe
9 Cylinder pipe
9a Attaching portion
12 Foreign material discharge pipe
13 Taper sheet
14 Vibration control ring
16 Resin bush
16a Head portion
16b Main body portion
17 Vibration control ring
22 Intermediate connecting pipe
24 Metal mesh

BEST MODE FOR CARRYING OUT THE INVENTION

A description will be given of preferred embodiments of a filter apparatus in accordance with the present invention with reference to the accompanying drawings.
<First Embodiment>
<Structure>

A main body container 1 is formed into a cylindrical shape, and a center axis x thereof is installed in such a manner as to come to a vertical state. The main body container 1 is manufactured, for example, from SS400 steel, and it is preferable that an inner wall surface is rubber lined for a corrosion prevention. A bottom lid 2 is coupled to the main body container 1 by welding or the like in a lower portion of the main body container 1, and an upper lid 3 is attached to an upper portion of the main body container 1. A flange 1a is integrally formed on an outer peripheral surface of a highest portion of the main body container 1, and the upper lid 3 is detachably attached by a bolt and nut mechanism 4.

An inflow pipe 5 is attached to an upper portion side close to the upper lid 3 of the main body container 1. The inflow pipe 5 is attached in such a manner as to come to a tangential direction with respect to a circumferential wall surface of the main body container 1. Accordingly, a liquid to be filtered which is introduced from the inflow pipe 5 forms a swirling flow swirling around the center axis x.

A tubular filter element 7 is provided in an inner portion of the main body container 1, and is installed in such a manner as to be coaxial with the main body container 1. The filter element 7 is manufactured by press stamping a metal plate, and filter holes 7a corresponding to a number of small holes are manufactured by a combination of a stamping work and a cutting work. As a raw material, for example, SUS304 stainless steel is used. The filter element 7 is formed into a circular truncated cone shape in which an upper portion has a large diameter and a lower portion has a small diameter, and an end portion of an outflow pipe 8 is bonded to a lower portion of the small diameter. The outflow pipe 8 is structured such that the filtered liquid is caused to flow out, and is attached in such a manner as to make an intrusion into an inner portion of the main body container 1 from the bottom lid 2 side, and a bottom portion of the filter element is sealed.

A cylinder pipe 9 is integrally bonded to an upper portion of the large diameter of the filter element 7 by a welding or the like. No hole is formed in a front face of the cylinder pipe 9, and the cylinder pipe 9 does not have any filter function. The surface of the cylinder pipe 9 may be formed as a taper surface. An attaching portion 1b protruding from a highest portion of an inner wall surface of the main body container 1 is coupled to an attaching portion 9a protruded from a cylinder surface of the cylinder pipe 9 by a bolt and nut 10. Accordingly, the filter element 7 is fixed to the main body container 1.

The attaching portions 1b and 9a mentioned above are provided, for example, at about three positions along a circumferential direction. Further, attaching surfaces of the attaching portions 1b and 9a are set vertical to the inner wall surface. The cylinder pipe 9 is manufactured, for example, from the SUS304 stainless steel, and the bolt and nut 10 is manufactured from the SUS304 in the same manner. It is possible to detach the filter element 7 so as to carry out maintenance by detaching the bolt and nut 10. The cylinder pipe 10 is positioned further above the inflow pipe 5. Further, it is possible to suppress an oscillation by using a vibration control washer (for example, M2052 manufactured by Seishin Engineering Co., Ltd.) at a time of coupling by means of the bolt and nut 10.

A bottom portion side of the main body container 1 is provided with a foreign material discharge pipe 12 for discharging a foreign material contained in the liquid to be filtered. The foreign material discharge pipe 12 is provided in a tangential direction with respect to the circumferential wall surface of the main body container 1, and can discharge the foreign material together with the liquid. The tangential direction extends along a direction of a swirling flow (a vortex forward direction), and it is possible to smoothly discharge by utilizing a swirling force. The foreign material discharge pipe 12 may be set to a normally open state, however, may be actuated so as to be opened at an appropriate timing and discharge the foreign material and the air bubble. For example, the structure may be made such as to intermittently open the foreign material discharge pipe 12 so as to discharge the foreign material. Of course, it is possible to operate in such a manner as to always discharge the foreign material while keeping the foreign material discharge pipe 12 open.

A taper sheet 13 (corresponding to a sheet layer) is attached to a position facing to the foreign material discharge pipe 12, in a lower portion of the filter element 7. The taper sheet 13 is formed by a double structure of a taper pipe and a rubber layer (corresponding to a vibration control member) provided in an outer peripheral surface of the taper pipe. The taper pipe is manufactured, for example, from the SUS304 stainless steel, and can be firmly attached to the lower portion of the filter element 7 by a welding or the like. A length in a vertical direction of the taper sheet 13 is approximately twice a diameter of the foreign material discharge pipe 12.

The rubber layer is attached to a front face of the taper pipe, for example, by adhesive bonding, heating fusion or adhesive bonding process or the like. In this case, an elastomer resin may be employed in place of the rubber, and it is preferable to manufacture by a material having a vibration control property, in short. The foreign material swirls together with the swirling flow around the foreign material discharge pipe 12, and if the foreign material comes into collision with the filter element 7, it causes a generation of a loud noise and a generation of the oscillation of the filter element 7. Accordingly, it is possible to suppress the noise and the oscillation mentioned above by attaching the taper sheet 13 having the vibration control property.

A vibration control ring 14 is provided between a lowest portion of the filter element 7 and an outer peripheral surface of the outflow pipe 8, and it is possible to manufacture by the rubber or the elastomer resin in the same manner as the taper sheet 13. With the vibration control ring 14, it is possible to inhibit the oscillation of the filter element 7 from being transmitted to the main body container 1. Further, the vibration control ring 14 serves as a liquid seal of the bottom portion of the main body container 1.

FIG. 1(c) is a view showing a cross sectional shape of the filter hole 7a of the filter element 7. The filter hole 7a is constructed by a cylinder portion 7b and a taper portion 7c, and a hole size r1 (positioned close to an inflow side) of the taper portion 7c is set to be larger than a hole size r2 (positioned close to an outflow side) of the cylinder portion 7b. FIG. 1(c) illustrates a direction in which a liquid (water) passes through by an arrow, however, the direction is set such that a diameter becomes larger in the inflow side.

Here, the filter hole 7a can be formed by a press stamping work, for example, a hole having a hole diameter φ4 mm can be formed in the SUS304 stainless steel having a thickness 4 mm. The filter holes 7a can be arranged in a zigzag manner at an angle of 60 degrees, and a hole pitch can be set to 8 mm. Further, the taper portion 7c as shown in FIG. 1(c) can be formed by cutting only one face to a depth 2 mm by a drill having a diameter 8 mm. Further, an angle of the taper is set to 59 degrees.

In this case, in the present invention, it is possible to appropriately set a rate of length of the cylinder portion 7b and the taper portion 7c, an angle of the taper and the like. Further, it is possible to appropriately set a size, an arrangement aspect, a formed number and the like of the filter holes 7a.

<Operation>

Next, a description will be given of a filtering operation of the filter apparatus in accordance with the first embodiment. The liquid containing the foreign material corresponding to the subject to be filtered is introduced from the inflow pipe 5. Since the liquid is introduced from the tangential direction, a forced vortex is generated by kinetic momentum of the liquid and the liquid is swirled. The forced vortex is a vortex in a state in which a flow rate becomes higher toward an outer diameter side.

Based on the centrifugal force generated by the swirling flow, the foreign material having a high specific gravity comes to a state in which the foreign material is separated and concentrated to the inner wall surface side, and foreign material comes down along the inner wall surface of the main body container 1 while whirling due to gravity. Further, the foreign material can be discharged out of the main body container 1 together with the liquid via the foreign material discharge pipe 12 provided in the bottom face portion. As an effect of forming the swirling flow, there is carried out an operation of peeling off the foreign material attached to the front face of the filter element 7 by the swirling flow in addition to the operation of concentrating the foreign material to the inner wall surface.

There is a case that the foreign material having a light specific gravity is attached to the front face of the filter element 7, however, the foreign material having the light specific gravity is returned to the floating state by the peeling operation of the high-speed swirling flow and is discharged from the foreign material discharge pipe 12 by the swirling flow together with the other foreign material. In order to satisfy both the functions of the centrifugal force and the peeling operation as mentioned above, it is necessary to form the swirling flow of the inflow liquid, and it is preferable that the liquid flow rate in the inlet portion of the inflow pipe 5 is equal to or higher than 1 m/s particularly in the case that a coefficient of viscosity of the liquid is equal to or less than $3 \times 10^{-3}$ Pa·s. It is preferable that the flow rate is made as high as possible, the flow rate of the swirling flow is approximately in proportion to the flow rate in the inlet portion. The higher the flow rate is, the more the performance as the filter apparatus can be achieved. However, if the speed of the swirling flow is made high, the metal fatigue caused by the oscillation generation of the filter element 7 is generated, and there is a problem that the noise is generated and the service life becomes short.

Since the taper surface is formed in the filter hole 7a of the filter element 7 as mentioned above, it is possible to inhibit the Karman's vortex from being generated, and it is possible to inhibit the filter element 7 from being oscillated. Accordingly, a whole or a part of the filter holes 7a is formed into the taper shape in such a manner that a hole size close to the inflow side of the fluid becomes larger than a hole size close to the outflow side. In this case, a relation of the hole sizes may be set to an inverted taper shape. Therefore, it is possible to reduce a loss of a kinetic energy at a time of passing through the filter hole, when the liquid passes through the filter hole 7a. Accordingly, it is possible to reduce the generation of the Karman's vortex involving the kinetic energy loss, and the oscillation energy caused thereby.

Further, since the front face of the taper sheet 13 provided in the lower portion of the filter element 7 is formed by the vibration control material, it is possible to suppress the oscillation caused by the collision of the foreign material (an iron piece, an oxide or the like) having the high specific gravity settling down to the bottom portion of the filter apparatus. Further, since the filter hole 7a is not formed in a region in which the taper sheet 13 is provided, the Karman's vortex generated by the liquid passing through the filter hole 7a is not formed.

Further, even if the oscillation is generated in the filter element 7 by the vibration control washer mentioned above provided in the upper portion of the filter element 7, and the vibration control ring 14, the oscillation is hard to be transmitted to the main body container 1, and it is possible to contribute to a long service life of the filter element 7, as well as reducing the noise.

The filter apparatus in accordance with the present embodiment was used for removing the foreign material in the metal rolling cooling and circulating water used in the iron works. As a result, a durability for a long term use can be confirmed.

<Second Embodiment>

Next, a description will be given of a filter apparatus in accordance with a second embodiment with reference to FIG. 2. The same reference symbols are attached to the portions having the same functions as those of the first embodiment. A description will be given while focusing on a different point from the first embodiment. This point is same applied to a third embodiment on and after.

The main body container 1 is installed in the same manner as the first embodiment such that the center axis x comes to the vertical direction, and is preferably manufactured from the SUS304 stainless steel. The filter element 7 is preferably manufactured, for example, from the SUS304 stainless steel as the raw material, and by stamping a number of small filter holes 7a from the plate by a press stamping work. Further, it is possible to apply a nitration heat treatment at 500° C. in $NH_3$ gas and a quench hardening treatment for preventing an abrasion. A Vickers hardness before the heat treatment is about HV200, however, the Vickers hardness can be set about HV450 after the heat treatment. It is possible to contribute to an improvement of the vibration control property by increasing the hardness. The filter element 7 is formed into a cylindrical shape from an upper portion to a lower portion, and has approximately the same axial length as the main body container 1.

A ring-like flange plate 7d is coupled by welding to the upper portion of the filter element 7. The filter element 7 is fixed to the main body container 1 by pinching an edge portion of the flange plate 7d by the flange 1a of the main body container 1 and the upper lid 3.

An upper end portion 8a of the outflow pipe 8 is attached to the bottom portion in a state of a little protruding out of the bottom portion of the main body container 1. Further, the vibration control ring 14 is interposed in the same manner as the first embodiment between the outflow pipe 8 and the lower portion of the filter element 7.

A vertical square bar 15 and a ring square bar 16 are fixed by welding to an inner portion of the filter element 7 for reinforcing. It is possible to appropriately set an arranged number and a pitch of the vertical square bars 15 and the ring square bars 16, and a size of their cross sections. Further, a round bar may be used in place of the square bar. The material can be set to the same as the filter element 7. It is possible to increase a strength of the filter element 7 so as to improve the vibration control property by setting the square bars 15 and 16.

Figure 2:
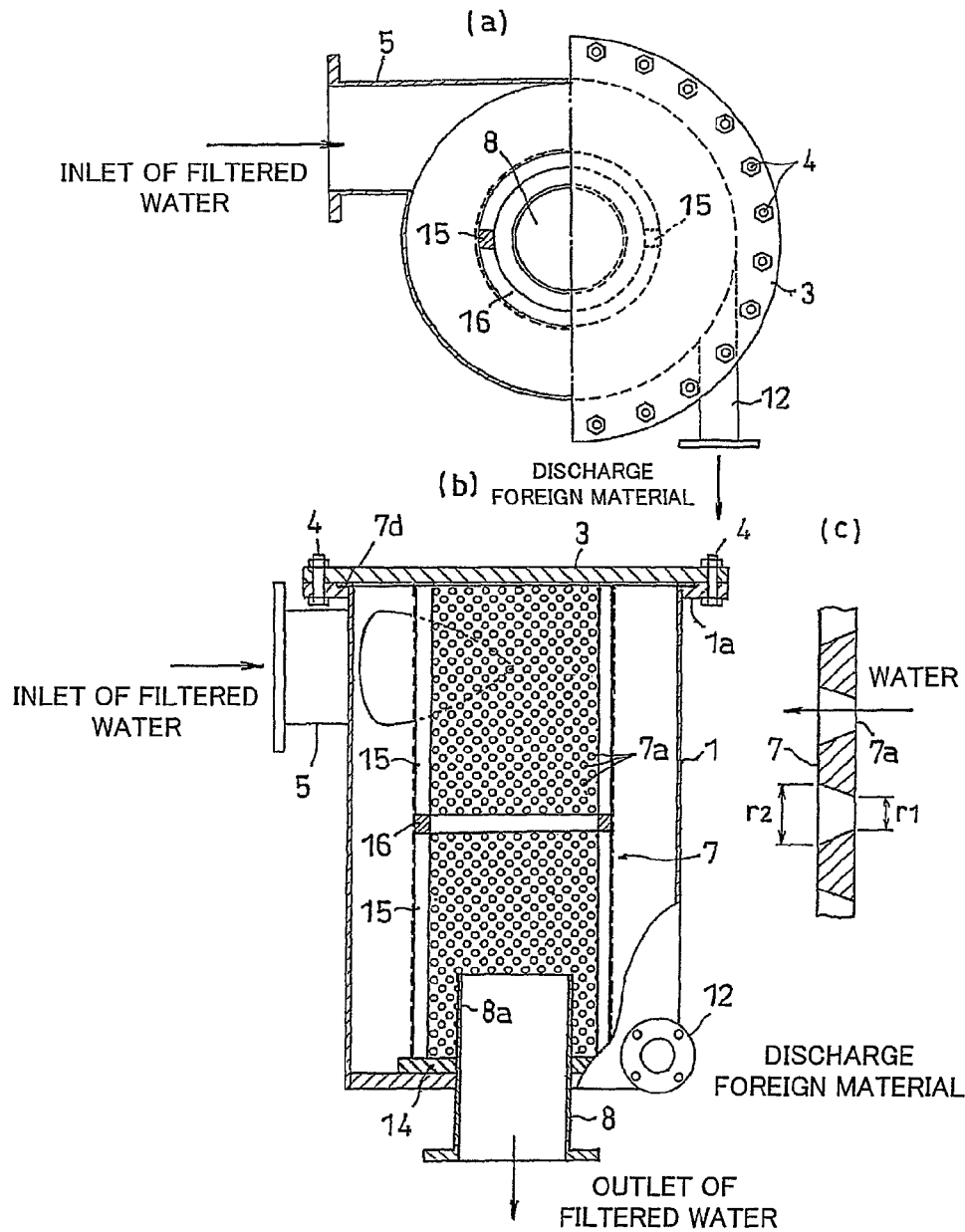
FIG. 2 is a view showing a structure of a filter apparatus in accordance with a second embodiment.

A cross sectional shape of the filter hole 7a of the filter element 7 is shown in FIG. 2(*c*). The filter element 7 can be manufactured, for example, from SUS316 stainless steel having a thickness 4 mm, and by press punching a hole having a hole diameter 5 mm. In this press stamping work, it is possible to make a shear layer of the stamping thick by securing a clearance width between a stamping die and a punch, thereby forming a taper hole as illustrated. As shown in the figure, it is possible to form a taper surface which is continuously inclined from the inlet side to the outlet side by the press stamping work at the same time of forming the hole. Specifically, it is possible to set r1=4.98 mm, and r2=5.25 mm.

The filter apparatus in accordance with the present embodiment was used for treating a slug generated at a time of a copper refinement. As a result, the filter apparatus can resist a long term use.

<Construction Example of Filter Hole by Resin Bush>

Figure 3:
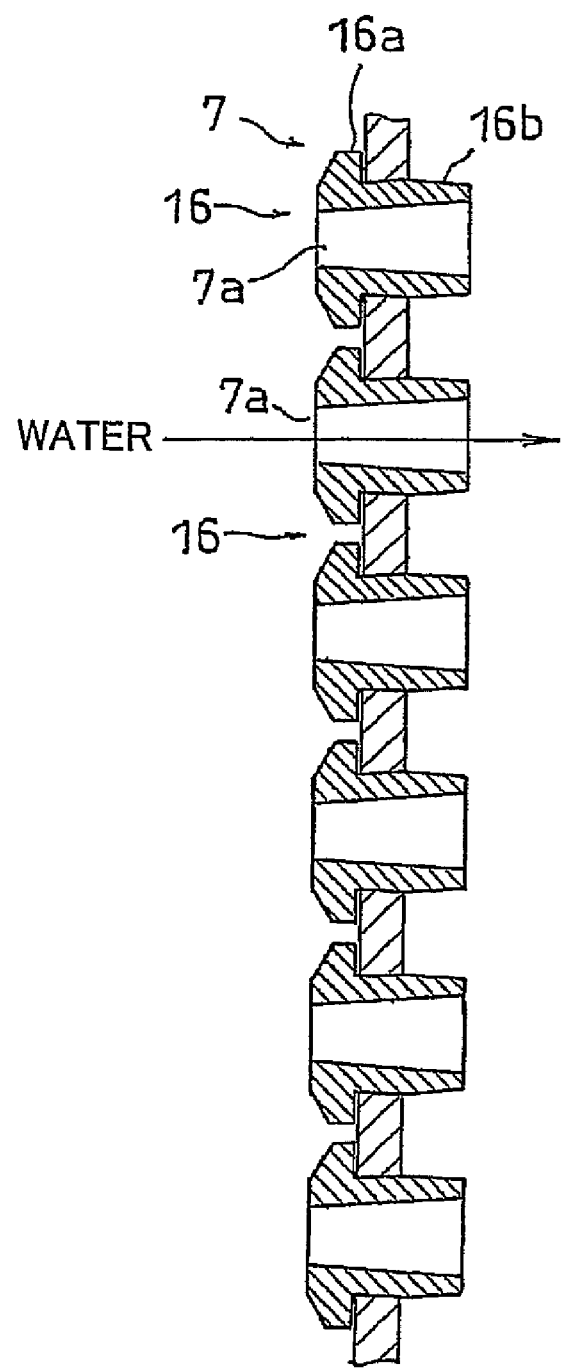
FIG. 3 is a view showing the other embodiment of a filter hole.

Next, a description will be given of an example in which the filter hole 7a is constructed by using a resin bush 16 with reference to FIG. 3. The resin bush 16 is constructed by a head portion 16a and a main body portion 16b, and a taper hole is formed along an axis. The resin bush 16 can be manufactured, for example, from a nylon 66 (for example, Leona 1300S manufactured by Asahi Kasei Corporation) by a resin molding, and can be attached to the filter element 7 by being pressure inserted to a hole which is previously formed in the filter element 7.

It is possible to securely fix by pressure insertion by setting an outer diameter of the main body portion 16b of the resin bush 16 to φ5.2 mm, and setting a diameter of the hole previously formed in the filter element 7 to 5 mm. Further, the resin bush 16 is attached in a state in which head portion 16a protrudes out of an outer peripheral surface of the filter element 7, and the main body portion 16b partly protrudes out of an inner peripheral surface. Accordingly, concavo-convex portions are repeatedly formed on the front face of the filter element 7. A front layer of the filter element 7 is going to have a turbulent flow layer by the concavo-convex portions, and the peeling of the fluid boundary layer is suppressed. As a result, it is possible to reduce the oscillation of the filter element.

The resin bush 16 can be manufactured from various materials in addition to the nylon. For example, it can be manufactured from thermoplastic resin such as ABS, AS, PS, PP, PE, PTFE, POM, PPE, PBT, PET, PC, PPS, PVC and the like. Further, it can be manufactured from rubber elastomer such as NR, IR, BR, SBR, EPDM, polyurethane, silicone, and the like. Further, it can be manufactured from thermosetting resin such as an unsaturated polyester resin, an epoxy resin, a phenol resin and the like. Further, the bush 16 may not be made of the resin, but can be manufactured from a ceramic including an aluminum oxide, a silicone oxide, an aluminum nitride, a silicone nitride, an iron oxide and the like as a main component. Alternatively, it can be manufactured from steel including stainless steel, or a metal such as nickel, a nickel alloy, copper, a copper alloy, titanium, a titanium alloy and the like. In the case of being manufactured from the metal, it can be manufactured by a machine cutting work from a general purpose bar material, a die casting molding, an injection molding, a press molding, a powder sintering method and the like. If the bush 16 is made of a different material from the filter element 7, it is possible to reduce the oscillation by the vibration control effect caused by the compounding with the raw material having a different elastic modulus.

<Third Embodiment>

Figure 4:
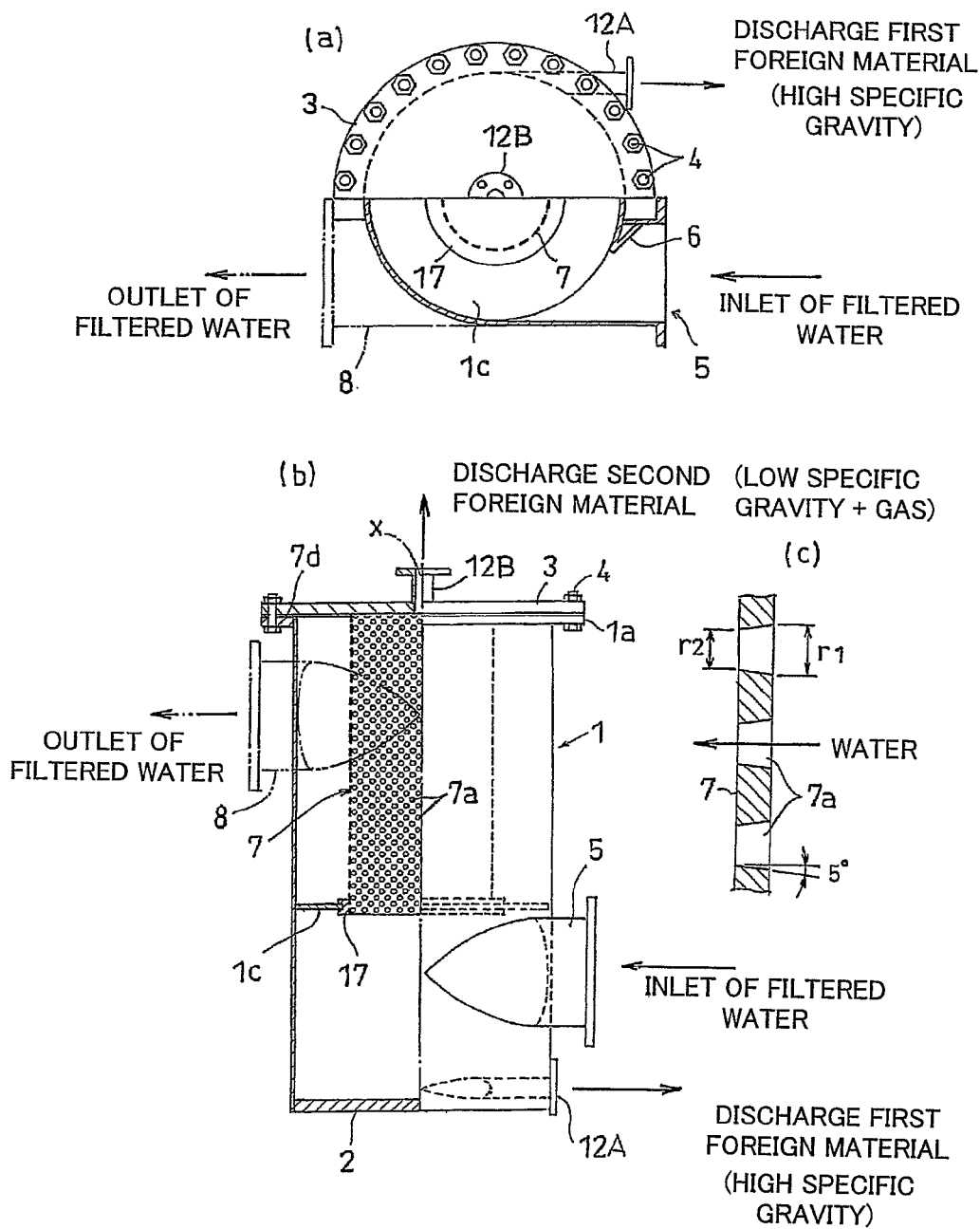
FIG. 4 is a view showing a structure of a filter apparatus in accordance with a third embodiment.

Next, a description will be given of a filter apparatus in accordance with a third embodiment with reference to FIG. 4. The main body container 1 is formed into a cylindrical shape, and is installed in such a manner that the center axis x thereof comes to the vertical state. The main body container 1 is manufactured, for example, from SS400 steel. An internal space of the main body container 1 is separated into a lower space and an upper space by a ring-like partition plate 1c, and the partition plate 1c is coupled to an inner wall surface of the main body container 1 by welding at a position which is somewhat below a center portion in a height direction of the main body container 1. A rubber lining for corrosion prevention is applied to the inner wall surface of the main body container 1.

The inflow pipe 5 is positioned close to the lower portion of the main body container 1, that is, close to the lower space, and is provided in such a manner as to come to the tangential direction with respect to the inner wall surface of the main body container 1. The outflow pipe 8 is also provided in the inner wall surface of the main body container 1 in such a manner as to come to the tangential direction, and is positioned in the upper space within the main body container 1. These tangential directions coincide with a direction of the swirling flow.

A dam 6 is provided in a boundary portion between the inflow pipe 5 and the main body container 1. The dam 6 forcibly orients the liquid flowing into from the inflow pipe 5 to the direction of the inner wall surface of the main body container 1. Accordingly, it is possible to generate a stronger swirling flow. With the dam 6, it is possible to inhibit the fluid from directly coming into contact with the filter element 7, and to reduce the generation of the oscillation. In this case, a direction of deflection by the dam 6 may include a deflection component to a direction of the bottom lid 2 or the upper lid 3, in addition to the direction to the inner wall surface.

The filter element 7 is arranged in the upper space, and the upper end portion thereof is supported to the main body container 1 by an integrally coupled flange 7d, in the same manner as the second embodiment. Further, a lower end portion thereof is coupled to the partition plate 1c by a vibration control ring 17. The vibration control ring 17 has the same purpose as already described in the first embodiment, and is structured such as to suppress the oscillation of the filter element 7. In this embodiment, the liquid passes through from the inner side of the filter element 7 to the outer side.

As the foreign material discharge pipe, there are provided a first foreign material discharge pipe 12A discharging a foreign material having a comparatively high specific gravity, and a second foreign material discharge pipe 12B discharging a foreign material having a comparatively low specific gravity and an air bubble.

The first foreign material discharge pipe 12A is provided in the bottom portion of the main body container 1, and in the lower portion of the inflow pipe 5. Further, it is provided in such a manner as to come to the tangential direction with respect to the inner wall surface of the main body container 1. The second foreign material discharge pipe 12B is fixed to the upper lid 3 in a center upper portion of the main body container 1.

A cross sectional shape of the filter hole 7a of the filter element 7 is shown in FIG. 4(c). There is formed the filter hole 7a having a taper portion in which an inner diameter is changed from an inflow side r1 of the liquid toward an outflow side r2. The filter element 7 is manufactured, for example, by machine working SUS316 stainless steel plate having a thickness 4 mm. Further, the filter hole 7a is formed as a hole having a diameter 5 mm, by a press stamping work. Further, each of the filter holes 7a can be formed as a taper hole as illustrated, by a taper reamer (for example, HTE2040 manufactured by Hitachi Tool Engineering, Ltd.). An angle of the taper can be set to 5 degrees. It is possible to inhibit the Karman's vortex from being generated, and to suppress the oscillation of the filter element 7 caused by the Karman's vortex, by forming the taper surface mentioned above.

Since the liquid inflowing from the inflow pipe 5 of the main body container 1 is introduced from the tangential direction, a forced vortex is generated by kinetic momentum of the liquid, and the liquid is swirled. Particularly, since the dam 6 is provided, it is possible to form a strong swirling flow. Based on the centrifugal force caused by the swirling flow, the foreign material having the high specific gravity whirls and comes down while being concentrated highly along the inner wall surface of the main body container 1, and is discharged together with the liquid from the first foreign material discharge pipe 12A.

Further, since the partition plate 1c is provided, it is possible to prevent the foreign material having the high specific gravity from moving upward, that is, from going to make an intrusion into the inner side of the filter element 7. On the other hand, the foreign material having the low specific gravity and the air bubble such as the air contained in the liquid tend to be concentrated to the shaft center by the swirling flow. The foreign material having the low specific gravity gather together to the center of the vortex, and moves up while getting on a tornado-like flow. Since the foreign material having the low specific gravity is concentrated to the shaft center, it comes to a state in which a contact frequency with the filter element 7 is small. The forced vortex is generated in the vicinity of the inflow pipe 5, however, a tendency of a free vortex increases in accordance with coming away from the inflow pipe 5. Accordingly, since a linear speed of the vortex center comes to an upward tendency, the foreign material having the low specific gravity concentrated to the vortex center is discharged from the second foreign material discharge pipe 12B provided in the upper lid 3 to the external portion of the main body container 1.

The filter apparatus in accordance with the present embodiment was used for removing sand, a jellyfish, seaweed, drifting garbage and the like in the sea water for cooling the thermal power generation. As a result, the filter apparatus can resist a long term use.

<Fourth Embodiment>

Figure 5:
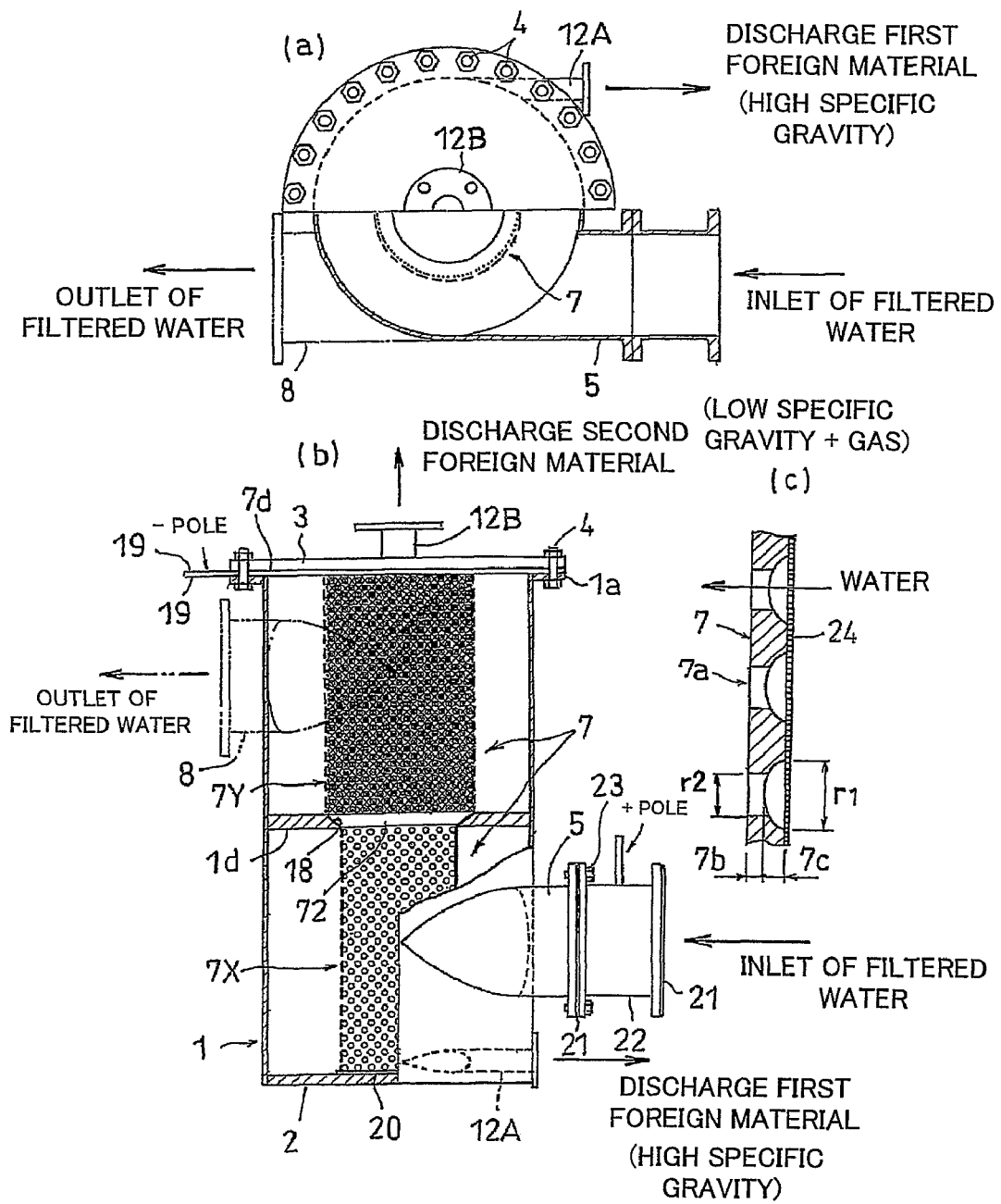
FIG. 5 is a view showing a structure of a filter apparatus in accordance with a fourth embodiment.

A description will be given of a filter apparatus in accordance with a fourth embodiment with reference to FIG. 5. The fourth embodiment is provided with two foreign material discharge pipes including the first foreign material discharge pipe 12A and the second foreign material discharge pipe 12B in the same manner as the third embodiment. A total length of the filter element 7 is approximately the same as a height of the main body container 1, however, is separated into a small diameter portion 7X and a large diameter portion 7Y. A taper portion 7Z is provided between the small diameter portion 7X and the large diameter portion 7Y. The taper portion 7Z is positioned approximately in the center in a height direction.

Approximately in the center portion of the main body container 1, an attaching portion 1d formed into a ring shape is coupled to the inner wall surface of the main body container 1 by welding. The attaching portion 1d is formed a taper surface corresponding to a taper portion 1Z, and supports the taper portion 7Z of the filter element 7 via a rubber packing 18. It is possible to compart the upper space and the lower space by closely attaching the rubber packing 18 to the taper portion 7Z. Further, it is possible to suppress an oscillation of the filter element 7 by interposing the rubber packing 18.

An upper end portion of the filter element 7 can be supported to the main body container 1 by providing the flange 7d in the same manner as the second embodiment. In this case, a rubber packing 19 is interposed in both front and back faces of the flange 7d, and it is supported in a state of being electrically insulated from the main body container 1. Further, a rubber packing 20 is interposed in a lower end portion of the filter element 7, and electrically insulates from the main body container 1. As mentioned above, the filter element 7 is electrically insulated from the main body container 1 by the rubber packings 18, 19 and 20, and applies a function of suppressing the oscillation. The rubber packing 19 also has a function as a liquid seal.

An intermediate connecting pipe 22 is coupled to the inflow pipe 5 via a rubber packing 21 by an insulating bolt 23. In other words, the intermediate connecting pipe 22 is connected to the inflow pipe 5 in an electrically insulated state. Since the intermediate connecting pipe 22 serves as an electrode, its length can be made short. The intermediate connecting pipe 22 is set to a first electrode portion (a positive pole), and the flange 7d of the filter element 7 mentioned above is set to a second electrode portion (a negative pole). The rubber packing 21 has a function as a liquid seal.

As a method of applying a voltage between the electrodes, a current application is carried out at a voltage between 1 V and 20 V, by using a non-grounded type DC power supply with current limiting function. A micro electrolytic generated air bubble (an air bubble) is generated on a front face of the filter element 7 in accordance with a principle of an electrolytic process, by carrying out the current application. Accordingly, it is possible to reduce the generation of the Karman's vortex generated in a rear side of the filter hole 7a of the filter element 7, and to reduce the oscillation of the filter element 7 caused by the Karman's vortex. Further, based on the generation of the air bubble, it is possible to achieve a subordinate operation and effect of suppressing a clogging of the filter hole 7a by striking up the foreign material attached to the front face of the filter element 7. In other words, it is possible to reduce a living thing such as algae attached to the front face of the filter element 7, and an adhesive material such as a scum, by carrying out the current application. If the clogging of the filter hole 7a is generated, a flow rate at a time of passing through the filter hole 7a is increased, and the Karman's vortex tends to be generated, however, it is possible to suppress the generation of the Karman's vortex by preventing the clogging.

FIG. 5(c) shows a cross sectional shape of the filter hole 7a of the filter element 7. A shape of the filter hole 7a is equal in the small diameter portion 7X and the large diameter portion 7Y. As illustrated, it is constructed by the cylinder portion 7b and the taper portion 7c. The taper portion 7c is actually formed as a spherical surface, however, such a shape is included in the taper surface. Specifically, the filter element 7 is formed by press stamping the filter hole 7a having a diameter 6 mm in the SUS316 stainless steel plate having a thickness 5 mm. Next, the illustrated filter hole 7a is formed by cutting each of the filter holes 7a to a depth 2.5 mm by a ball end mill (GXB2100 manufactured by Hitachi Tool Engineering, Ltd.) having R=5 mm. A hole diameter close to the cut surface is r1=9.5 mm.

Further, a plain-woven metal net 24 (corresponding to the net-like body) having 30 mesh is fixed to an inner side of the large diameter portion 7Y by spot welding. A magnitude of the metal net 24 is set so as to become smaller than a diameter of the filter hole 7a. The metal net is not provided in an inner side of the small diameter portion 7X. Based on the provision of the metal net 24, it is possible to inhibit the fluid boundary layer from peeling off in the front face of the filter element 7, and to inhibit the Karman's vortex from being generated. Accordingly, it is possible to reduce the oscillation of the filter element 7. In this case, the metal net 24 may be provided in an outer peripheral surface side in place of the inner peripheral surface side of the filter element 7. Alternatively, it may be provided in both of them. Further, it may be provided in the small diameter portion 7X.

The filter apparatus in accordance with the present embodiment was used as the filter apparatus of the dam type hydraulic power station and was used for removing a pebble, a leaf, the algae, a putrefaction, the scum and the like. The filter apparatus can resist a long term use. Further, a metal fatigue caused by the oscillation of the filter element 7 is not recognized even by setting an inflow speed of the inflow pipe 5 to 3 m/s.

<Fifth Embodiment>

Figure 6:
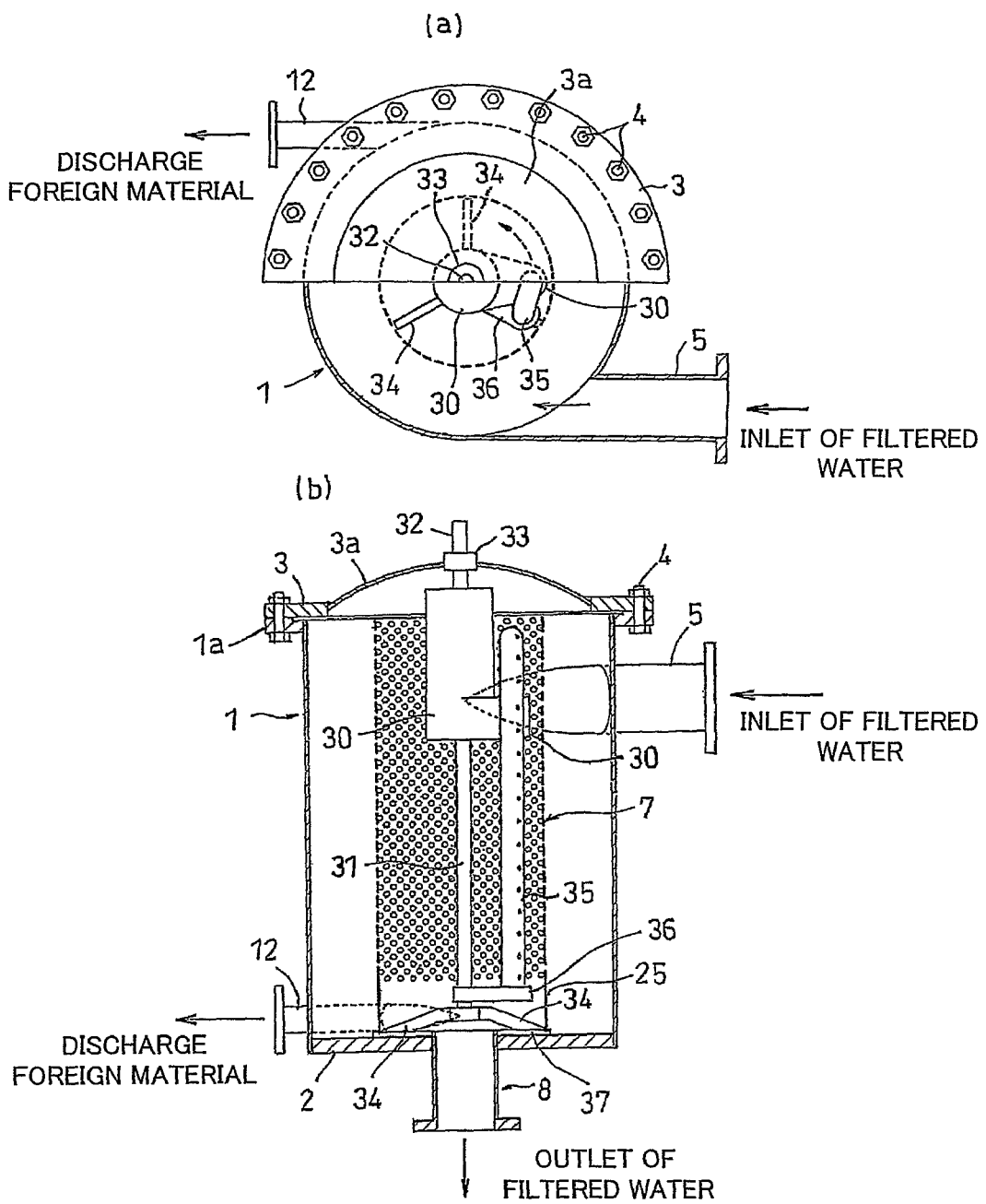
FIG. 6 is a view showing a structure of a filter apparatus in accordance with a fifth embodiment.
Figure 7:
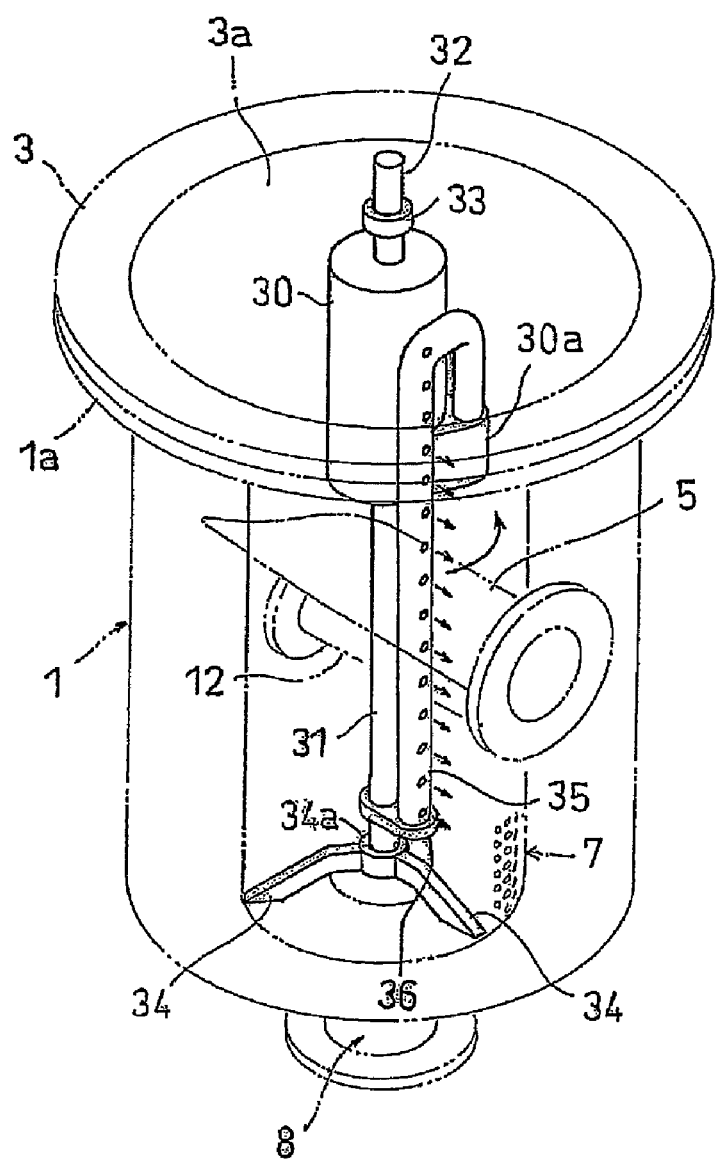
FIG. 7 is a view showing a structure of a cleaning apparatus.

A structure of a filter apparatus in accordance with a fifth embodiment is shown in FIG. 6. A mechanism for cleaning an inner peripheral surface of the filter element 7 is installed in the filter apparatus. A submerged pump 30 for cleaning is supported by a lower shaft 31 and an upper shaft 32, and these shafts exist on a center axis of the main body container 1. The upper lid 3 has a spherical surface portion 3a protruding upward, and a center thereof is supported by a bearing 33. The lower shaft 32 is supported to a bearing portion 34a provided in a bearing leg 34 integrally welded in a lower end portion of the filter element 7. The bearing leg 34 is provided in such a manner that three bearing legs extend radially from the center of the filter element 7, and is set such that a height is increased toward the center, and the bearing portion 34a is provided in the highest center portion. The upper shaft 32 is formed as a hollow shaft, and a wiring cable for driving the submerged pump 30 is installed.

A cleaning pipe 35 is provided in a leading end attaching portion 30a of the submerged pump 30, and a number of holes for discharging a jet flow in a horizontal direction are formed. An upper portion of the cleaning pipe 35 is supported to the leading end attaching portion 30a, however, a lower portion thereof is supported by a support leg 36 protruding in a radial direction from the lower shaft 31. It is possible to clean the inner peripheral surface of the filter element 7 by discharging the jet flow toward the inner peripheral surface of the filter element 7. It is preferable to make a front face of the cleaning pipe 35 as close as possible to the inner peripheral surface of the filter element 7. Accordingly, it is possible to efficiently clean.

The submerged pump 30 is structured such as to be rotatable around the center axis of the main body container 1, whereby it is possible to clean the inner peripheral surface of the filter element 7 over a whole surface. A water absorbing direction by the submerged pump 30 corresponds to an arrow direction as illustrated. As the submerged pump 30, for example, it is possible to use 50TM2.5S manufactured by Tsurumi Manufacturing Co., Ltd.

Further, it is possible to bring a volume of high-pressure fluid into collision with the filter element 7 from the internal portion of the filter element 7 by using the submerged pump 30, thereby dissolving the state in which the hole is clogged by the dust. If the dust clogging is generated, a speed at a time when the fluid passes through the hole is increased, and there is a tendency that the oscillation becomes large. Accordingly, it has an effect of lowering the oscillation by dissolving the dust clogging. Further, in the case of using the submerged pump 30 for the purpose mentioned above, if a spouting direction of the fluid is aligned with a direction of the swirling flow, it is possible to use the submerged pump 30 while operating the filter apparatus.

A cylinder sheet 25 is provided in the lower end portion of the filter element 7, and is used for the same purpose as the taper sheet 13 in accordance with the first embodiment. A length in a height direction of the cylinder sheet 25 is set about twice a diameter of the foreign material discharge pipe 12. Accordingly, it is possible to suppress the generation of the noise and the oscillation caused by the collision of the foreign material with the front face of the filter element 7. Further, a ring-like fixed plate 37 is firmly attached to the lowest end portion of the filter element 7 by welding, and a leading end portion of the outflow pipe 8 is inserted to a center of the fixed plate 37.

Further, it is preferable that the main body container 1, the inflow pipe 5, the outflow pipe 8 and the foreign material discharge pipe 12 are manufactured, for example, from SS400 steel, and an FRP lining is applied to an inner wall surface (a liquid contact portion) thereof. A resin used as the FRP can employ, for example, Lipoxy R-802 manufactured by Showa Highpolymer Co., Ltd.

Figure 8:
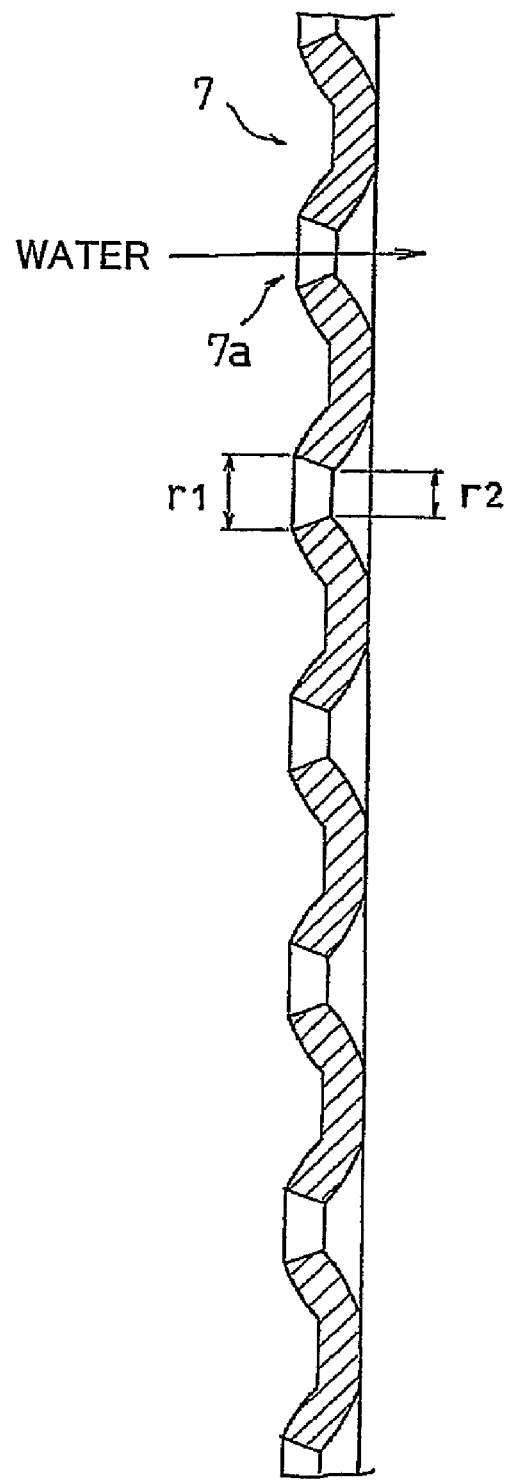
FIG. 8 is a view showing a cross sectional shape of a filter hole.

FIG. 8 is a view showing a cross sectional shape of the filter hole 7a. The filter element 7 is structured, for example, such that the filter hole 7a having a hole diameter 3 mm is formed in the SUS304 stainless steel plate having a thickness 2 mm in accordance with the press stamping work. Next, a protrusion is formed in an outer surface of the filter element 7 by a press drawing mold having a partial spherical shape of R=5 mm (R is indicated by a broken line in FIG. 8). Accordingly, there is formed a taper hole in such a manner that an inflow side diameter r1 of the liquid becomes larger than an outflow side diameter r2. At the same time when the filter hole 7a is formed as the taper hole, concavo-convex portions are formed in front and rear faces of the filter element 7.

Since the filter hole 7a as mentioned above is formed, it is possible to suppress the generation of the Karman's vortex generated at a time when the liquid passes through the filer hole 7a, and to suppress the oscillation of the filter element 7 caused thereby. Further, since the concavo-convex portions are formed in the front face of the filter element 7, the boundary layer peeling is suppressed. As a result, it is possible to reduce the oscillation of the filter element 7. Further, with the protrusion in the front face, it becomes easy to peel off the foreign material attached to the outer surface, particularly a film-like foreign material by the swirling flow.

In the inner peripheral surface side of the filter element 7, the concave portion is formed around the filter hole 7a, however, the jet flow tends to be concentrated to the filter hole 7a at a time of cleaning by the submerged pump 30, by forming the concave portion mentioned above, so that the cleaning effect can be increased. Further, it becomes easy to dissolve the clogging. In this connection, it is possible to periodically carry out the cleaning by the submerged pump 30.

The filter apparatus in accordance with the present embodiment was used for removing the earth and sand, the sludge, the scam, the plastic film piece and the like in a sewage treatment plant. As a result, the filter apparatus can resist a long term use. In the case that the inflow speed of the inflow pipe 5 is set to 2.5 m/s, it is possible to safely and stably use the filter apparatus particularly without generation of the oscillation in the filter element 7.

<Other Embodiments>

The description is given of five embodiments relating to the present invention, however, various embodiments can be further employed. Further, the structure employed in each of the embodiments can be employed in the other optional embodiments. For example, it is possible to apply the shape of the filter hole described in each of the embodiments to the other embodiments. For example, it is possible to employ the support structure of the filter element 7 and the same function as the taper sheet 13 employed in the first embodiment in the other embodiments. For example, the filter element 7 may be formed into a cylindrical shape or a circular truncated cone shape. With regard to the arrangement structure of the inflow pipe 5, the outflow pipe 8 and the foreign material discharge pipe 12, they can be installed to appropriate places. Further, the same applies to the other structures.

With regard to the structure of the taper sheet 13 in the first embodiment, it can be structured as follows. First, a region in which the filter hole 7a is not formed may be formed in the lower end portion of the filter element 7. Further, a sheet having a vibration control property such as a rubber sheet or the like may be wound around a surface in this region.

The description is variously given of the structure of the filter hole 7a, however, it is possible to select whether the hole size in the inflow side of the liquid is enlarged, or the hole size in the outflow side is enlarged. Further, in the case that the hole shape is formed taper, the shape may be optionally set. For example, it is possible to appropriately decide an angle of the taper, whether the taper is formed in a linear shape or a curved shape, how long the cylinder portion is set in the case of the combination of the cylinder portion and the taper portion, and the like. With regard to the hole shape, the hole is not limited to the circular hole, but can employ various shapes such as a rectangular shape, a square shape, an oval shape and the like. Further, it is not necessary to form all the filter holes 7a formed in the filter element 7 in the taper shape mentioned above, but only the partial filter hole 7a may be formed into the taper shape.

With regard to the materials of the main body container 1, the inflow pipe 5, the outflow pipe 8, the foreign material discharge pipe 12 and the filter element 7, it is possible to select the other various materials than the materials described in the present embodiments.

For example, as the filter element 7, there can be exemplified various kinds of steels including the stainless steel, the nickel, the nickel alloy, the copper, the copper alloy, the titanium, the titanium alloy and the like. In the case of forming the filter element 7 by the metal mentioned above, it is possible to form at least a part thereof by the metal mentioned above, and it is possible to attach in an electrically insulated state from the main body container 1. In this case, it is possible to attach a zinc, an aluminum, a magnesium or a magnesium alloy in the vicinity of the filter element 7, preferably the inflow pipe. Accordingly, it is possible to avoid a consumption of the filter element 7 due to an electrolytic corrosion, and it is possible to inhibit the filter element 7 from tending to be oscillated due to a progress of the corrosion.

The main body container 1, the inflow pipe 5, the outflow pipe 8 and the like can be manufactured from the various kinds of steels including the stainless steel, the nickel, the nickel alloy, the copper, the copper alloy, the titanium, the titanium alloy, a clad material (a laminated material) between the metals and the steel, and the like. Alternatively, they can be manufactured by a fiber reinforced thermosetting resin (FRP) or a fiber reinforced thermoplastic resin (FRTP). In this case, a glass fiber, a carbon fiber, an aramid fiber, a polyester fiber and the like can be used as the reinforced fiber. An unsaturated polyester resin, an epoxy resin, a phenol resin and the like can be used as the thermosetting resin. For example, ABS, AS, PS, PP, PE, PTFE, POM, PPE, PBT, PET, PC, PPS, PVC and the like can be used as the thermoplastic resin.

As a corrosion preventive lining of the inner wall surface (the liquid contact portion) such as the main body container 1, the inflow pipe 5, the outflow pipe 8, NR, IR, BR, SBR, NBR, EPDM, polyurethane, silicone and the like can be used as a rubber lining.

In the present embodiment, the main body container 1 is installed vertically, however, the present invention is not limited to this, but may be installed horizontally, for example. Based on the horizontal installation, a gravitational force applied to the liquid is differentiated by the position in the circumferential direction of the filter element 7. It is possible to lighten the magnitude of the oscillation based on an asymmetry effect.

In the present embodiment, the description is given of the structure in which the concavo-convex portions are formed in the front face of the filter element 7, however, the following structures can be employed in addition to the structures described in the present embodiments. For example, the oscillation can be prevented by forming the concavo-convex portions by attaching a reinforcing rib in the front face of the filter element 7. Particularly, with respect to the oscillation having a frequency which is close to a fundamental specific frequency of the filter element 7, it is effective to provide the reinforcing rib in the axial direction of the filter element 7, as described in the second embodiment, because the specific frequency of the filter element can be shifted to a high frequency side so as to escape from a resonance region. With respect to a higher order frequency, an annular reinforcing rib is effective, as described in the second embodiment.

Various modified examples can be considered about the manufacturing method of the filter element 7, however, it is preferable to manufacture it by machine working a metal flat plate, while using the metal flat plate as a raw material. In the metal flat plate, it is easy to punch a number of filter holes 7a necessary for the filter element 7 by a precision machine, and a manufacturing efficiency is good. In other words, it is possible to manufacture the filter element 7 having the cylindrical shape, the conical shape, the circular truncated cone shape by punching in the flat plate state and thereafter bending it. In this case, the punching work may be carried out after bending to the cylindrical shape or the like, in place of punching first.

With regard to the punching work and the work of the concavo-convex portions, the general purpose machine working technique can be used as already described in the embodiments, and it is possible to use a plasma work, an electric discharge machining, a drill, a reamer, an end mill and the like, in addition to the press stamping work. Further, in these working methods, it can be worked by combining a plurality of methods, in place of one method.

Various modified examples can be considered with respect to the metal net 24 (the net-like body) described in the fourth embodiment. The net-like body can be manufactured from woven fabric in addition to the metal wire. The net-like body may be firmly attached to the filter element 7 before bending the filter element 7 into the cylindrical shape or the like, or may be firmly attached after bending into the cylindrical shape or the like.

The attaching portions 1b and 9a in the first embodiment carry out a function of generating a turbulence in the swirling fluid so as to prevent the resonance of the fluid and the oscillation of the filter element 7 generated as a result. For this purpose, a vane shaped member may be provided particularly in the vicinity of the connecting portion between the inflow pipe 5 and the main body container 1. The member mentioned above can be integrally attached to the main body container 1, the upper lid 3 and the filter element 7 (as one example, refer to Japanese Unexamined Patent Publication No. 2007-296492)

As the liquid to be treated by the filter apparatus in accordance with the present invention, there can be considered various liquids such as the water, the sea water, the lake water, the industrial water, however, the liquid is not limited to the specific liquid.

The invention claimed is:

1. A filter apparatus comprising:
   a cylindrical main body container
   a tubular filter element made of a metal plate, which is provided coaxially with the main body container within the main body container;
   a plurality of filter holes for removing a foreign material contained in a liquid, said filter holes being formed in the tubular filter element, all or part of said filter holes having a taper shape in which a hole size in an inflow side of a fluid is different from a hole size in an outflow side;
   a plurality of concavo-convex portions provided in an outer peripheral surface of the filter element around each of the filter holes having the taper shape, said plurality of concavo-convex portions being formed adjacent to one another such that a continuous, repeated concavo-convex structure is formed;
   an inflow pipe provided in a tangential direction with respect to a circumferential wall surface of the main body container, and introducing the liquid containing a subject to be separated;
   an outflow pipe causing the liquid filtered by the filter element to flow out; and
   a foreign material discharge pipe provided in the tangential direction with respect to the circumferential wall surface of the main body container, and discharging the subject to be separated together with the liquid.

2. The filter apparatus as claimed in claim 1 comprising a bush having a taper hole inserted to the filter holes having the taper shape so as to provide the taper shape thereof,
   wherein the head portion of the bush is projected from the surface of filter element so as to provide the plurality of concavo-convex portions.

3. The filter apparatus as claimed in claim 2, wherein the bush is made of a different material from the filter element.

4. The filter apparatus as claimed in claim 1, wherein a net-like body is provided in an inner peripheral surface side and/or an outer peripheral surface side of the filter element.

5. The filter apparatus as claimed in claim 1, wherein a surface having no filter hole is provided in the filter element at a position at which a foreign material discharge pipe face to each other.

6. The filter apparatus as claimed in claim 5, wherein a sheet layer having an elasticity is provided in the surface having no filter hole.

7. The filter apparatus as claimed in claim 1, wherein the filter element is attached to the main body container in a state where a vibration control member is interposed therebetween.

8. The filter apparatus as claimed in claim 1, further comprising a first electrode portion attached to the inflow pipe in an insulated state, and a second electrode portion attached to the filter element, wherein an air bubble is capable of being generated in the vicinity of the filter hole of the filter element by exciting between the electrode portions.

9. The filter apparatus as claimed in claim 1, wherein the filter element is formed into a conical shape having a larger diameter in the inflow pipe side than in the outflow pipe side.

* * * * *